W. BUSH.
Velocipede.
No. 164,902. Patented June 29, 1875.
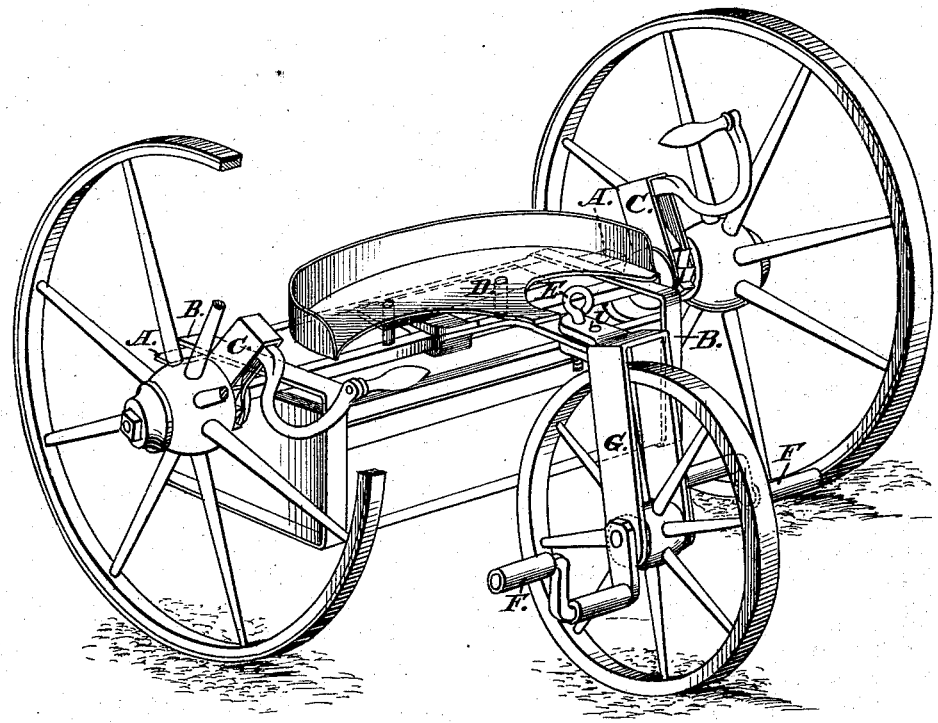
Witnesses:
James Bligh.
William Krusemarck.
Inventor.
William Bush.

UNITED STATES PATENT OFFICE.

WILLIAM BUSH, OF CHICAGO, ILLINOIS.

IMPROVEMENT IN VELOCIPEDES.

Specification forming part of Letters Patent No. 164,902, dated June 29, 1875; application filed October 29, 1874.

*To all whom it may concern:*

Be it known that I, WILLIAM BUSH, of Chicago, in the county of Cook, State of Illinois, have invented a new Improvement in Velocipedes or Vehicles having three wheels, and being an improvement on my velocipede for which Letters Patent were granted on or about October 6, 1874, and being numbered 155,569; and I do hereby declare that the following is a description thereof, reference being had to the accompanying drawing making a part of this specification, and to the letters of reference marked thereon.

Figure 1 in the accompanying drawing is a perspective view of a vehicle containing my improvements.

Similar letters of reference indicate corresponding parts.

In the drawing, A A represent two projections or brakes fastened to the frame-bars, marked B B in the drawing, which latter are fastened to the rear axle of said vehicle, and to which frame is attached underneath the axle a box to carry parcels along. Said brakes are in the rear of said axle, so that when the levers and handles, marked C C in the drawing, are turned sufficiently back to rest against said brakes, then the vehicle will not run backward if it should stand on an upward-inclined plane.

The vehicle can be propelled in two ways, either together or alternately, the object of which is to combine in one vehicle two modes of propelling by the feet and hands, either to use them at the same time, and thus procure a quicker transit than usual, or use the feet and hands alternately, so that one may rest while the other propels.

The two rear wheels turn on the rear axle, and are larger than the front wheel. On each nave on the inside of each rear wheel is attached a toothed wheel, in whose teeth fits a vibrating pivot, which is attached to one of said levers and handles. The latter is worked by the hands of the occupant, moving thus the vehicle forward.

To the middle of the rear axle is attached a bridge or guard, marked *i* in the drawing, which connects the rear axle to the front wheel by means of the usual attachments connecting front wheels of velocipedes to the rear body, and the arrangement for them to turn either way.

To the nave of the front wheel is rigidly attached a double-cranked axle, marked F F in the drawing, whose extremities are so bent as to bring them to a line in the same horizontal plane with the center of motion of the wheel. Said cranked parts of said axle and said extremities are incased in revolving hollow rollers or thimbles made of wood or metal, to diminish the wear and tear of shoe-soles.

Said vehicle may be propelled with the feet of the occupant by pushing said cranks to describe a circle. When the occupant is tired propelling himself with the feet and desires to use his hands, he can rest his feet by putting them on the central horizontal extremities of said cranked axle.

Said occupant can also compel the vehicle to make a curve and guide the front wheel with his feet on said cranks, or by pushing against said central horizontal extremities of said axle.

To the said bridge *i*, and to the upper attachments of said front wheel, marked G in the drawing, is inserted a set-screw, marked E in the drawing, which will compel the front wheel to take a straight course, if desired by the occupant, by turning it a few rounds in said front-wheel attachments, so that the point of said set-screw will advance in an indentation of said bridge, and thus hold rigidly said front wheel straight forward.

The seat, marked D in the drawing, rests on two iron pins fastened to the upper part of said rear axle, which pins or bolts project into fitting indentations made in the under part of said seat, so as to give the latter immobility. The front part of the seat is attached with a screw to said bridge, so that the seat may be easily detached from the vehicle without injury thereto.

It has a back to it, so that the occupant can rest against it, and is so shaped as to permit the easy movement of the limbs when moving the vehicle. Said seat may also be attached in the usual manner.

Having thus described my invention, I claim as new and desire Letters Patent—

1. The brakes A A, combined with the levers C, substantially as and for the purposes set forth.

2. The seat D, attached to and combined with the bridge and axle, substantially as and for the purposes set forth.

3. The method of propelling a vehicle by the lever attachments to the rear wheels, and a crank attachment to the front wheel, singly or combined, substantially as and for the purposes set forth.

WILLIAM BUSH.

Witnesses:
 JAMES BLIGH,
 WILLIAM KRUSEMARCK.